July 23, 1946.    R. J. BRITTAIN, JR    2,404,429
RAILWAY JOURNAL BOX
Filed Jan. 2, 1943    2 Sheets-Sheet 1
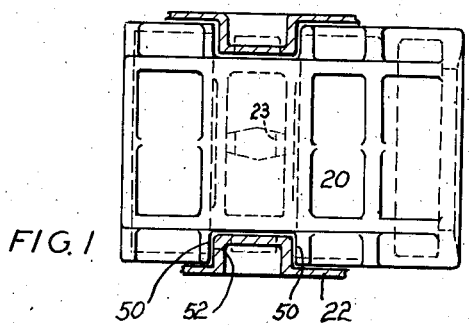
FIG. 1
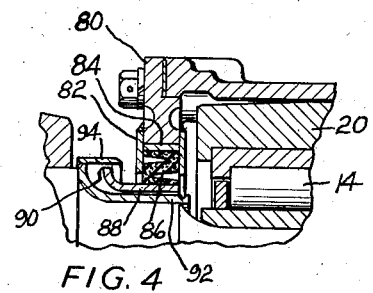
FIG. 4
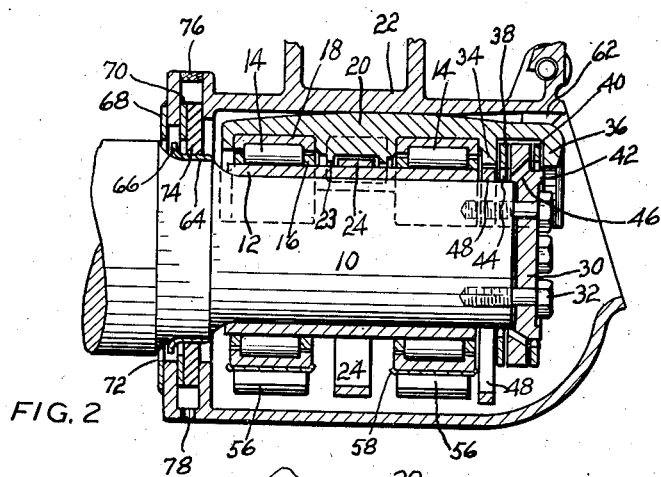
FIG. 2
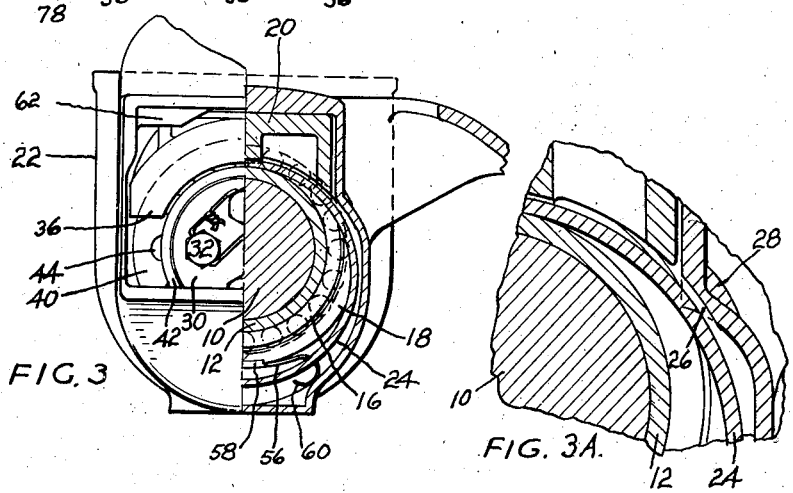
FIG. 3
FIG. 3A.
INVENTOR:
RICHARD J. BRITTAIN JR.
BY Romeyn A. Spare
HIS ATTORNEY July 23, 1946. R. J. BRITTAIN, JR 2,404,429
RAILWAY JOURNAL BOX
Filed Jan. 2, 1943 2 Sheets-Sheet 2
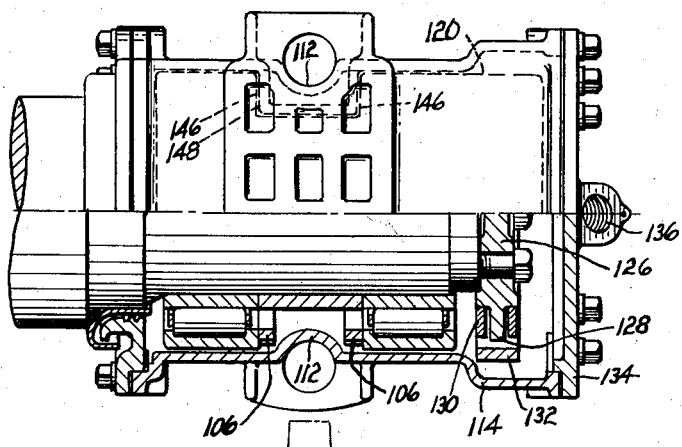//
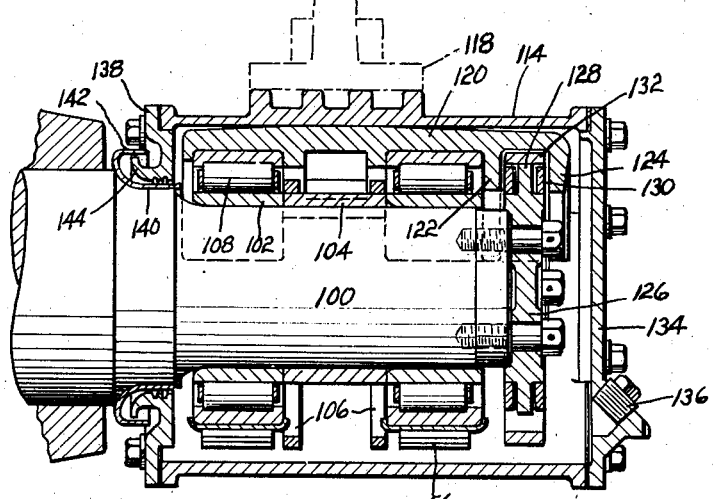
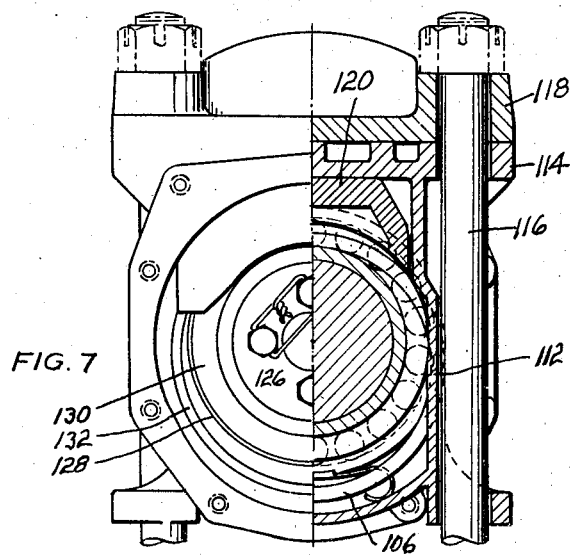
INVENTOR:
RICHARD J. BRITTAIN JR.
BY Romayn A. Spare
HIS ATTORNEY Patented July 23, 1946

2,404,429

UNITED STATES PATENT OFFICE 2,404,429

RAILWAY JOURNAL BOX

Richard J. Brittain, Jr., Bloomfield, N. J., assignor to General Motors Corporation, Detroit, Mich., a corporation of Delaware Application January 2, 1943, Serial No. 471,107

12 Claims. (Cl. 308—180)

This invention relates to railway journal boxes and comprises all of the features and aspects of novelty herein disclosed. An object of the invention is to provide an improved roller bearing and wedge member which will replace or be interchangeable with a plain bearing brass and wedge in a box of standard A. R. A. dimensions and this without any substantial change in the existing standard box. Another object is to provide improved devices for transmitting lateral thrust forces from the axle journal to the box. Another object is to provide an improved oiling means for the bearings and thrust surfaces. Still another object is to produce an improved end closure which will prevent leakage under conditions of misalignment between the journal and the box.

To these ends and also to improve generally upon devices of this character, the invention consists in the various matters hereinafter described and claimed. In its broader aspects, the invention is not necessarily limited to the specific constructions selected for illustration in the accompanying drawings in which Fig. 1 is a top view of a wedge member, portions of the sides of the box being shown in section.

Fig. 2 is a vertical sectional view taken lengthwise of the box.

Fig. 3 is one half an end view of Fig. 2 and one half a section across the center.

Fig. 3A is an enlarged sectional view of a portion of Fig. 3.

Fig. 4 is a longitudinal sectional view to a larger scale than Fig. 2 showing another form of end closure.

Fig. 5 is one half a plan view and one half a horizontal section of another form of box.

Fig. 6 is a vertical section taken lengthwise of Fig. 5.

Fig. 7 is one half an end view and one half a section across the center of Fig. 6, an end cap being removed.

A shaft or axle journal 10 carries a raceway sleeve 12 for two rows of roller bearings 14 having cages 16. Each row of rollers runs in an outer raceway sleeve 18 between flanges thereof and each sleeve 18 is received in an internal recess of a wedge member 20 which is crowned on the top for rocking movement against a flat face in a housing or journal box 22. The wedge member is provided with depending lugs 23 forming a central recess receiving the upper portion of an oiling ring 24 which is supported on the sleeve 12 and dips into oil in the bottom of the box. The ring is held from substantial axial movement by the lugs 23 and elevates oil to the sleeve along which the oil works to the roller bearings. The box 22 is of standard A. R. A. dimensions and needs no alteration except that it is advisable to cut it away slightly at the sides as indicated at 26 in Fig. 3A to make more room for an oiling ring 24 of ample diameter to reach the oil well. Where the sides are cut the box is preferably strengthened by welding on metal to the exterior as indicated at 28.

A thrust plate or collar 30 is detachably fastened against the flat end of the journal by bolts 32, the collar being slightly cupped to engage around the chamfered end of the journal. The collar 30 is circular and its outer portion forms a thrust flange extending into a recess or groove formed by opposed thrust surfaces on depending flanges or ribs 34 and 36 projecting inwardly from the wedge member. The lower edges of the flanges or ribs terminate above axle level so that the collar 30 can be removed downwardly out of the groove. Between the collar and the inner flange 34 is a thrust ring or washer 38 rotatably supported by the axle journal, and between the collar and the outer flange 36 is a second thrust ring or washer 40, the latter being rotatably supported on a circular seat or shoulder extending laterally of the collar and desirably formed on an axially projecting flange or annular rib 42 of the thrust collar. Each washer which is preferably made of bronze has its inner supported periphery provided with a plurality of notches or openings 44 as best shown in Fig. 3, these notches forming passages for oil and communicating at intervals during rotation with a series of slanting passages or ports 46 in the thrust collar. An oiling ring 48 is supported on the journal 10 just inside of the flange 34 and, besides supplying oil to the adjacent bearing, also delivers oil to the notches in the thrust washers and through the ports 46. This oil has access to both sides of each thrust washer and to the co-operating thrust surfaces on the flanges 34 and 36 and on the thrust collar.

The axle has a limited amount of axial movement before the thrust surfaces come into action to transmit thrust forces to the wedge member 20. The wedge member itself transmits thrust in opposite directions to the box as best shown in Fig. 1, the sides of the wedge member having recesses with lateral thrust surfaces or walls 50 adapted to engage lateral thrust surfaces or walls 52 on inward projections at the sides of the box. Thus lateral thrusts are transmitted in both directions from the wedge member to the box and in both directions from the axle thrust collar to the wedge member.

Below the bearings are removable resilient supporting members 56 having side flanges 58 embracing the raceway sleeves 18. The supporting members extend crosswise of the box and have their ends curled as at 60 where they resiliently engage the bottom of the box at each side of the center. The springy supporting members support the bearings and the wedge member from dropping down in the box when the axle is being inserted or when it is being removed. To release the axle for endwise removal while the bearings and the wedge member remain assembled in the box, it is only necessary to remove the bolts 32 which detachably secure the collar 30. The collar and the thrust washers will readily come down out of the groove in the wedge member for removal through the front end of the box. To release the wedge member for endwise removal past the usual box lugs 62, the resilient supporting members 56 can be sprung out from under the bearings. The box is of standard A. R. A. dimensions so that the roller bearings and the wedge member will replace or be interchangeable with the usual brass and wedge. The axle may be of standard form and size with the usual integral outer collar machined off for replacement by the detachable collar 32.

The outer or front end of the box has a suitable lid (not shown) and the inner or rear end of the box has a leak-proof guard. A sleeve 64 having a slinger rib 66 is secured on the axle near the fillet, the rib projecting outwardly towards a groove formed by a ring 68 and a plate 70 the former being welded to the rear end of the box. The plate 70 has its bore concentric with the axle but the ring 68 has its bore eccentric to the axle so that the groove fades out or disappears at the bottom as indicated at 72 to form a drain opening. The plate 70 is bonded to a guard 74 preferably of resilient, yieldable material and the united parts are inserted or slid downwardly into a groove in the box through the usual top opening which is closed by a cover 76. The bottom of the box groove has a drain opening 78. The guard 74 has smooth running contact with the sleeve 64 and maintains sealing contact when the axle rocks in the box.

Fig. 4 indicates a modified guard for the rear end of the box. A flanged end wall or plate 80 is bolted to the box or housing and has an internal groove in the upper half formed by half rings or semicircular side plates 82 welded to its opposite sides. Within the groove is a metal sleeve 84 bonded to the outer flange of a resilient ring 86 of Z-shaped cross section, this ring preferably being formed of synthetic rubber or the like. The inner flange of the ring is resiliently bendable and is bonded to a second metal sleeve 88 preferably of bronze and extended outwardly to form a curved slinger rib 90. The sleeve 88 normally has a very small clearance with a sleeve 92 secured on the axle and conforming to the fillet, a guard 94 being welded to the curved end of the sleeve 92 and overhanging the slinger rib 90. In the normal operative position of the axle, the sleeves 88 and 92 are just out of contact. Upon any tilting of the axle in any direction or other movement from normal, the sleeves come into light rubbing contact, the ring 86 or its flange yielding thereafter under light pressure so that there is no forcible contact. The result is a self-aligning action of the guard with the axle with no appreciable load on the end plate 80. When removing the axle and the bearings from the box or inserting them in the box, the side plates 82 act to protect the yieldable ring 86 which can readily yield outwardly between them in case these parts engage the raceway sleeve 12. All parts of the closure are symmetrical with respect to the center of the axle except that the plates 82 are preferably semicircular and surround only the upper half of the axle. The sleeve 92 or a portion thereof may be omitted if the axle surface and the sleeve 88 have the correct clearance or the outer surface of the sleeve 92 may be considered as a finished surface of revolution on the shaft.

In Figs. 5, 6 and 7, the invention is shown applied to a locomotive turntable. The journal 100 has two inner raceway sleeves 102 separated by a spacing sleeve 104 on which a pair of spaced oiling rings 106 are mounted to supply oil to the bearing rollers 108. As shown in Fig. 5, the spacing of the rings 106 allows rounded projections 112 on the sides of the housing or box 114 to enter between them, such projections having external bolt recesses for bolts 116 which clamp the box to a bottom member (not shown) and a top plate 118. A wedge member 120 which is similar to the wedge member 20 of Fig. 2 has a groove or recess between depending thrust flanges 122 and 124. A thrust collar 126 is bolted to the end of the axle and has annular ribs or circular seats extending laterally on opposite sides of a narrow outwardly extending flange 128 to rotatably support a pair of bronze thrust washers 130. An oil ring 132 is supported on the flange 128 to rotate in spaced relation to the bottom of the groove in the wedge member and elevates oil to the thrust surfaces, the box being widened at the sides to clear the ring.

The front end of the box is closed by a cap 134 having a plugged opening at 136 to introduce oil. The rear end of the box may have the same type of guard as shown in Fig. 1 or Fig. 4 but is shown provided with an end ring 138 having a grooved portion closely surrounding a sleeve 140 on the journal. The sleeve conforms to the fillet and has a reversely bent guard portion 142 overhanging an outwardly bent terminal rib 144 on the sleeve 140. The thrust collar and the thrust washers transmit lateral thrusts from the axle journal to the wedge member in opposite directions. As shown at the top of Fig. 5, the wedge member transmits the thrust to the box in opposite directions, there being a recess in each side of the wedge member with lateral thrust walls 146 normally slightly spaced from thrust walls 148 on internal projections near the upper portions of the box.

I claim:

1. In a device of the character indicated, a journal box, an axle journal extending into the box, a wedge member between the journal and the box, an antifriction bearing between the wedge member and the journal, the wedge member having a pair of internal flanges forming a groove with opposed thrust surfaces near the end of the journal, a thrust collar secured to the end of the journal and projecting into the groove between the thrust surfaces thereof to transmit axle thrust in opposite directions from the journal to the wedge member, the sides of the box having inward projections with opposed thrust surfaces, the sides of the wedge member having recesses with opposed thrust walls embracing the projections to transmit thrust in opposite directions from the wedge member to the box, the wedge member being located entirely above axle level so that the groove between its flanges is open only downwardly, and the collar being detachably connected to the journal for downward removal from the groove to provide for endwise removal of the journal from the assembled bearing, wedge member and box.

2. In a device of the character indicated, a journal box, an axle journal extending into the box, a wedge member between the journal and the box, an antifriction bearing between the wedge member and the journal, the wedge member having a pair of internal flanges forming a groove with opposed thrust surfaces near the end of the journal, a thrust collar secured to the end of the journal and projecting into the groove between the thrust surfaces to transmit thrust thereto, means including an oiling ring rotatable with the journal for conveying oil to opposite sides of the thrust collar and to said thrust surfaces, and the collar being detachable from the journal to provide for release of the oiling ring.

3. In a device of the character indicated, a journal box, an axle journal extending into the box, a wedge member between the journal and the box, an antifriction bearing between the wedge member and the journal, the wedge member having a pair of internal flanges integral therewith and extending downwardly to form a downwardly open groove with opposed thrust surfaces near the end of the journal, a thrust collar on the journal and projecting into the groove between the thrust surfaces thereof, the collar being removably secured to the end of the journal to provide for endwise removal of the journal from the box while the wedge member and the box remain in assembled position, and the lower edges of the flanges terminating above axle level to provide for dropping the collar out of the groove when the collar is released from the journal.

4. In a device of the character indicated, a journal box, an axle journal extending into the box, a wedge member between the journal and the box, an antifriction bearing between the wedge member and the journal, the wedge member having a pair of internal flanges forming a groove with opposed thrust surfaces near the end of the journal, a thrust collar on the journal and projecting into the groove between the thrust surfaces thereof, the collar being detachably secured to the end of the journal to provide for endwise removal of the journal from the assembling bearing, wedge member and box, and a supporting member interposed between the bottom portion of the box and the bearing to prevent the bearing and the wedge member from dropping down in the box when the journal is removed.

5. In a device of the character indicated, a journal box, an axle journal extending into the box, a wedge member between the journal and the box, an antifriction bearing between the wedge member and the journal, the wedge member having a pair of internal flanges forming a groove with opposed thrust surfaces near the end of the journal, a thrust collar secured to the end of the journal and projecting into the groove between the thrust surfaces thereof, at least one side of the thrust collar having a circular seat extending laterally thereof, a thrust washer supported on the seat and entering the groove, and an oiling ring rotatable with the journal for conveying oil to the thrust washer.

6. In a device of the character indicated, a journal box, an axle journal extending into the box, a wedge member between the journal and the box, an antifriction bearing between the wedge member and the journal, the wedge member having a pair of internal flanges forming a groove with opposed thrust surfaces near the end of the journal, a thrust collar secured to the end of the journal and projecting into the groove, a thrust washer rotatably supported by the axle alongside of the collar, an oiling ring rotatably supported on the axle alongside of the thrust washer, the thrust washer having passages near its inner periphery to conduct oil to the collar and the collar having oil passages slanting outwardly from the washer passages to the opposite side of the collar to convey oil to the thrust surfaces.

7. In a device of the character indicated, a journal box, an axle journal extending into the box, a wedge member between the journal and the box, an antifriction bearing between the wedge member and the journal, the wedge member having a pair of internal flanges forming a groove with opposed thrust surfaces near the end of the journal, a thrust collar secured to the end of the journal and projecting into the groove between the thrust surfaces thereof, the periphery of the collar terminating in spaced relation to the bottom of the groove, and an oiling ring entering the groove and supported on the periphery of the thrust collar clear of the bottom of the groove to carry oil to the thrust surfaces.

8. In a device of the character indicated, a journal box, an axle journal extending into the box, a wedge member between the journal and the box, a roller bearing between the wedge member and the journal, the wedge member having a pair of integral internal flanges forming a groove with opposite thrust surfaces near the end of the journal, the journal having a collar removably attached thereto and projecting into the groove, the lower edges of the thrust surfaces terminating above axle level to provide for downward removal of the collar from the groove, and the wedge member and bearing being interchangeable with a plain bearing brass and wedge.

9. In a device of the character indicated, a journal box, an axle journal extending into the box, a wedge member between the journal and the upper portion of the box, an antifriction bearing surrounding the journal, a collar detachably secured to the journal beyond the end of the bearing, the upper portion of the bearing engaging and supporting the wedge member and the lower portion being spaced from the bottom of the box, and a supporting member interposed between the bottom portion of the box and the bearing to prevent the bearing and the wedge member from dropping in the box when the collar is removed from the journal and the journal is removed endwise from the bearing.

10. In a device of the character indicated, a journal box, an axle journal extending into the box, a wedge member between the journal and the upper portion of the box, an antifriction bearing surrounding the journal, the upper portion of the bearing engaging and supporting the wedge member and the lower portion being spaced from the bottom of the box, and a spring member in the box, one portion of the spring member engaging the lower portion of the bearing and another portion engaging the bottom portion of the box, the bearing having a continuously circular outer race ring to transmit the lifting force of the spring to the wedge member and to thereby hold the bearing and the wedge member upwardly in the box when the journal is being axially inserted into or removed from the bearing.

11. In a device of the character indicated, a journal box, an axle journal extending into the box, a wedge member between the journal and the upper portion of the box, an antifriction bearing surrounding the journal, the upper portion of the bearing engaging and supporting the wedge member and the lower portion being spaced from the bottom of the box, and a resilient supporting member engaged between the bottom portion of the box and the bearing, the supporting member having its engaging ends bent into curves.

12. In a device of the character indicated, a journal box, an axle journal extending into the box, a wedge member between the journal and the upper portion of the box, an antifriction bearing comprising rolling elements and an outer raceway sleeve surrounding the journal, the upper portion of the bearing supporting the wedge member and the lower portion being spaced from the bottom of the box, a bearing supporting member extending crosswise of the box, the supporting member having an intermediate sleeve-engaging portion with side flanges embracing the sleeve and the opposite ends of the supporting member being curled to resiliently engage the bottom portion of the box.

RICHARD J. BRITTAIN, Jr.